(12) United States Patent
Hatton et al.

(10) Patent No.: US 8,814,473 B2
(45) Date of Patent: Aug. 26, 2014

(54) PIPE TRANSPORT SYSTEM WITH HYDROPHOBIC WALL

(75) Inventors: Gregory John Hatton, Houston, TX (US); Ajay Praful Mehta, Houston, TX (US); David Joseph Peters, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/805,706

(22) PCT Filed: Jun. 21, 2011

(86) PCT No.: PCT/US2011/041192
§ 371 (c)(1),
(2), (4) Date: Dec. 20, 2012

(87) PCT Pub. No.: WO2011/163190
PCT Pub. Date: Dec. 29, 2011

(65) Prior Publication Data
US 2013/0087207 A1    Apr. 11, 2013

Related U.S. Application Data

(60) Provisional application No. 61/358,199, filed on Jun. 24, 2010.

(51) Int. Cl.
| | | |
|---|---|---|
| F16L 1/12 | (2006.01) | |
| F16L 9/147 | (2006.01) | |
| B05D 1/18 | (2006.01) | |
| B82Y 40/00 | (2011.01) | |
| F16L 9/00 | (2006.01) | |
| B05D 7/22 | (2006.01) | |
| F17D 1/00 | (2006.01) | |
| F16L 11/12 | (2006.01) | |
| B82Y 30/00 | (2011.01) | |

(52) U.S. Cl.
CPC . *F17D 1/00* (2013.01); *F16L 9/147* (2013.01); *B05D 1/185* (2013.01); *B82Y 40/00* (2013.01); *F16L 9/00* (2013.01); *B05D 7/222* (2013.01); *F16L 11/12* (2013.01); *B82Y 30/00* (2013.01)
USPC .......................... 405/169; 405/158; 138/145

(58) Field of Classification Search
USPC ........... 405/158, 169, 170; 138/139, 140, 145
See application file for complete search history.

(56) References Cited

U.S. PATENT DOCUMENTS

| | | | |
|---|---|---|---|
| 7,052,736 B2 | 5/2006 | Wei et al. | 427/230 |
| 7,344,783 B2 | 3/2008 | Shea | 428/429 |
| 7,351,480 B2 | 4/2008 | Wei et al. | 428/634 |
| 7,485,343 B1 | 2/2009 | Branson et al. | 427/335 |
| 2003/0235471 A1* | 12/2003 | Bass et al. | 405/154.1 |
| 2004/0045620 A1 | 3/2004 | Kranbuehl | 128/139 |
| 2007/0160754 A1 | 7/2007 | Blaise-Graftieaux et al. | 427/230 |
| 2010/0133150 A1 | 6/2010 | Chakrabarty et al. | 208/390 |

FOREIGN PATENT DOCUMENTS

WO    WO2010017082    2/2010  ............. B32B 27/40

* cited by examiner

*Primary Examiner* — Frederick L Lagman

(57) ABSTRACT

A pipe system comprising a pipe comprising an exterior of the system, the pipe comprising an inner pipe wall; a hydrophobic layer interior to the inner pipe wall; and a liquid interior to the hydrophobic layer and interior to the inner pipe wall, the liquid comprising water and one or more hydrocarbons.

15 Claims, 1 Drawing Sheet

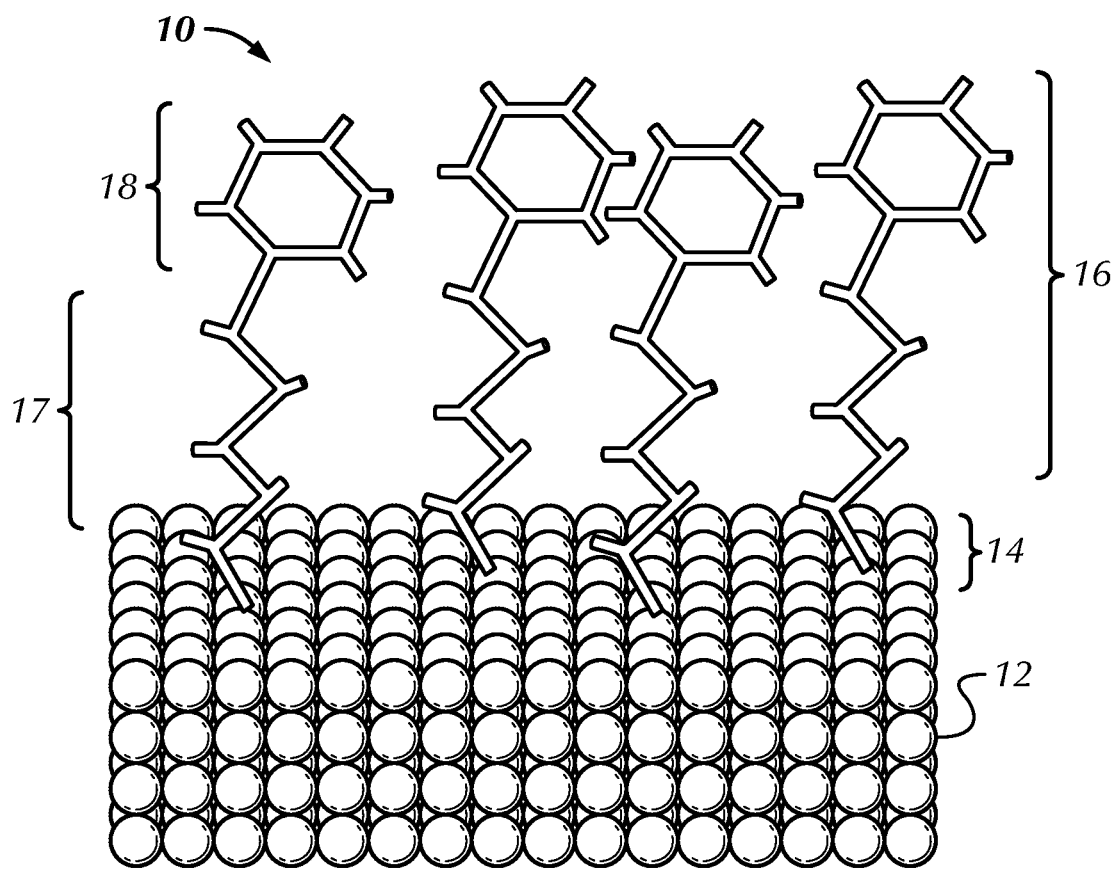

PIPE TRANSPORT SYSTEM WITH HYDROPHOBIC WALL

PRIORITY CLAIM

The present application claims priority from PCT/US2011/041192, filed 21 Jun. 2011, which claims priority from U.S. provisional application 61/358,199, filed 24 Jun. 2010, which is incorporated herein by reference.

BACKGROUND OF INVENTION

1. Field of the Invention

The invention relates to pipe systems and their methods of use.

2. Background Art

PCT Patent Application WO 2010/17082 discloses printing blankets, pipe liners, conveyor belts, inflatable articles, collapsible containers, protective clothing, and other types of coated fabrics that are manufactured with a thermoplastic block copolymer (TBC). This TBC can be a thermoplastic polyurethane (TPU), a copolyester (COPE), a copolyamide (COPA) or a polyurethaneurea (TPUU). It also a printing blanket or printing sleeve and a cured in place liner for a passageway or pipe. The TBC is (I) the reaction product of (1) a hydrophobic polyol or polyamine, (2) a polyisocyanate or an aromatic dicarboxylic acid, and (3) a linear chain extender containing 2 to 20 carbon atoms, or (II) the reaction product of (1) a hydrophobic polyol or polyamine, and (2) a carboxylic terminated telechelic polyamide sequence. PCT Patent Application WO 2010/17082 is herein incorporated by reference in its entirety.

U.S. Pat. No. 7,485,343 discloses a method for preparing a hydrophobic coating by preparing a precursor sol comprising a metal alkoxide, a solvent, a basic catalyst, a fluoroalkyl compound and water, depositing the precursor sol as a film onto a surface, such as a substrate or a pipe, heating, the film and exposing the film to a hydrophobic silane compound to form a hydrophobic coating with a contact angle greater than approximately 150 degrees. The contact angle of the film can be controlled by exposure to ultraviolet radiation to reduce the contact angle and subsequent exposure to a hydrophobic silane compound to increase the contact angle. U.S. Pat. No. 7,485,343 is herein incorporated by reference in its entirety U.S. Pat. No. 7,344,783 discloses a hydrophobic coating including solid silsesquioxane silicone resins to increase durability. The hydrophobic coating is any composition that increases the contact angle to a surface, preferably glass. The durability of the hydrophobic coating is preferably increased to one and a half years, more preferably three years. U.S. Pat. No. 7,344,783 is herein incorporated by reference in its entirety.

SUMMARY OF THE INVENTION

One aspect of the invention provides a pipe system comprising a pipe comprising an exterior of the system, the pipe comprising an inner pipe wall; a hydrophobic layer interior to the inner pipe wall or a hydrophobic layer extending from within the pipe wall to the interior to the inner pipe wall; and a fluid-solid stream interior to the hydrophobic layer and interior to the inner pipe wall, the fluid-solid stream comprising water, one or more hydrocarbons, and produced solids.

Advantages of the invention include one or more of the following:

reduced formation of deposits on interior pipe walls, such as hydrates;

transport of produced fluids with significantly reduced deposits;

transport of produced fluids without deposits;

a reduced force required for pigging; and/or generation of a fluid slurry when pigging.

BRIEF DESCRIPTION OF THE DRAWING

FIG. 1 is an example of a self-assembled monolayer in accordance with embodiments disclosed herein.

DETAILED DESCRIPTION

In one aspect, embodiments disclosed herein relate to a system and method for preventing hydrate blockages in conduits. Specifically, some embodiments disclosed herein relate to a pipeline with a hydrophobic inner wall and methods for making the same to prevent hydrate blockage. Other embodiments disclosed herein relate to a pipeline with a hydrate-phobic inner wall and methods for making the same to prevent hydrate blockage.

In another aspect, embodiments disclosed herein relate to a process for reconditioning the inner wall of a conduit to inhibit hydrate formation. Specifically, some embodiments disclosed herein relate to a process for reconditioning a hydrophobic inner wall of a pipeline that includes chemical soaking.

In some embodiments of the present disclosure, the inner wall of a conduit (e.g., a steel tube, pipeline, flowline, etc.) is modified to be hydrophobic or hydrate-phobic to prevent hydrate blockage. Generally, hydrates are crystalline clathrate compounds (i.e., inclusion compounds) formed by hydrocarbons and water under low temperature and high pressure conditions. However, hydrates may also form from non-hydrocarbons, such as carbon dioxide, nitrogen and hydrogen sulfide, under the proper temperature and pressure conditions. The term "hydrocarbon," as used herein, may include both hydrocarbons and non-hydrocarbons that are used to form hydrates. Hydrocarbons may generally include alkyls, alkenyls, alkynyls, cycloalkyls, aryls, alkaryls, and aralkyls, for example. Specific examples of hydrate-forming hydrocarbons include, but are not limited to, ethylene, acetylene, propylene, methylacetylene, n-butane, isobutene, 1-butene, trans-2-butene, cis-2-butene, isobutene, butane mixtures, isopentane, pentenes, argon, krypton, xenon, and mixtures thereof. The term "hydrocarbon" may also refer to natural gas. Natural gas hydrocarbons may include methane, ethane, propane, butane, nitrogen, oxygen, carbon dioxide, carbon monoxide, hydrogen, and hydrogen sulfide, for example.

Hydrate formation requires the presence of water (even in small amounts), a temperature lower than the hydrate formation limit, and a pressure above the hydrate formation pressure. The rate of hydrate formation is increased by turbulence that keeps the water, gas, and the stream elements intermixed. By modifying the inner wall to be hydrophobic, the wall will prefer hydrocarbons to water. Thus, hydrocarbons flowing through the conduit will wet the inner wall, and prevent hydrate deposits, thereby making the inner wall hydrate-phobic. This is advantageous over traditional systems that merely inject chemical inhibitors into a stream flowing through the conduit because chemicals do not need to be continually added.

The term "hydrophobic," as used herein, refers to a tendency to not dissolve (i.e., associate) readily in water. A moiety may be hydrophobic by preferring to bond or associate with other hydrophobic moieties or molecules, thereby excluding water molecules. The term "hydrate-phobic" refers to a tendency to not be wetted or covered by hydrates.

One skilled in the art will recognize that it may be advantageous to prepare the surface of the inner wall of a conduit prior to modifying (e.g., coating) the wall. In particular, surface preparations of steel conduits are desirable to assure OH— groups are available for bonding. The primary bonding mechanism of steel with various surface modifications or coatings is through OH— groups found in steel compositions. Thus, surface preparations typically involve removing any oxide layers and/or other impurities (i.e., scale) found on the surface of a steel conduit to expose or create OH— groups for bonding. Surface preparations may include a thermal cleaning step, a chemical cleaning or etching step, a mechanical cleaning step, a blasting step, or a combination thereof. For example, a surface preparation process may include a thermal and chemical cleaning step involving etching the surface with a conventional halogenated solvent at 700° F. for 2-4 hours and then blasting the surface with alumina and titania particles of a specific size to create a desired anchor pattern on the surface. In other cases, mechanically clean surfaces— e.g., surfaces that have been electro-polished—may only require a rinse with ethyl alcohol to prepare the surface for coating.

In some embodiments of the present disclosure, a priming step may be desirable after the surface preparation step and before the modifying or coating step. Such a priming step may include spraying the conduit with (or flowing through the conduit) priming molecules (e.g., siloxane) used to bond with the exposed OH— groups (from the surface preparation step) and a subsequently applied coating.

In one embodiment, the inner wall of a conduit is modified to be hydrophobic or hydrate-phobic by attaching self-assembling molecules to the inner wall of a conduit to form a self-assembled monolayer (SAM). For example, 14-phenyl-1-tetradecanethiol can be synthesized from (commercially available) 14-phenyl-11-tetradecen-1-ol. $C_8$-thiol to $C_{18}$-thiol or other SAMs, with chemistries similar to hydrate anti-agglomerate molecules, can be selectively adsorbed at the inner wall interface to construct an organized and oriented monolayer. Some SAMs may be applied at temperatures of less than 200° F. and atmospheric pressure.

Anti-agglomerates generally act to prevent smaller hydrates from agglomerating into larger hydrate crystals so that the smaller hydrates can be pumped through the conduit. Examples of anti-agglomerate molecules that may be coated to the inner wall of a conduit include tributylhexadecylphosphonium bromide, tributylhexadecyl-ammonium bromide, and other alkylated ammonium, phosphonium or sulphonium compounds, zwitterionic compounds such as $R(CH_3)_2N^+—(CH_2)_4—SO_3^{31}$.

FIG. 1:

Referring to FIG. 1, molecules with hydrophobic tails 10 are attached to a substrate 12 to form a SAM. In a preferred embodiment, the substrate 12 is the inner wall of a conduit (e.g., pipeline). Each molecule 10 has a head end 14 and a tail end 16. The head end 14 includes a functional group selected to bind to the substrate material 12. Substrate material may include chromium steel, low alloy steel, titanium steel, stainless steel, any other steel alloy that may be found in conventional commercially available steel pipelines, corrosion resistant alloys (CRA), CRA with over-layers of gold, or other metals used to form a conduit. Suitable functional groups for use on the head end 14 include, for example, that of 14-phenyl-1-tetradecanethiol. The tail end 16 includes a chain 17 and optionally includes a functional group 18 selected to provide a hydrophobic SAM on the substrate 12. Suitable functional groups 18 for use on the tail end 16 include hydrocarbons such as alkanes, alkenes, alkynes, cycloalkanes, cycloalkenes, cycloalkynes, and aromatic hydrocarbons, such as aryls. Further, $C_8$ through $C_{18}$-thiols, amines, and phosphates are hydrophobic SAMs that may be used on the substrate material to make a conduit hydrophobic.

In another embodiment, the inner wall of a conduit is modified to be hydrophobic or hydrate-phobic by applying a plasma generated coating to the inner wall. Examples of plasma coating materials and methods may be found in U.S. Pat. No. 7,351,480 and U.S. Pat. No. 7,052,736, which are herein incorporated by reference in their entirety.

In certain embodiments, it may be desirable to recondition the inner wall of a conduit. For example, hydrophobic and hydrate-phobic qualities of the wall may be degraded during hydrate remediation or with time. Thus, by conditioning and/or chemical soaking, the inner wall may regain the desired hydrophobic and hydrate-phobic qualities that were lost.

Embodiments of the present disclosure have an advantage over traditional systems that inject chemicals into a stream flowing through a conduit or flowline (i.e., chemical-injecting systems). In chemical-injecting systems, chemicals used to prevent hydrate blockages are swept away by a stream flowing through the conduit, and thus, the chemicals must be continuously added. Advantageously, embodiments of the present disclosure do not require continuous addition of chemicals to prevent hydrate blockages.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A pipe system comprising:
    a pipe comprising an exterior of the system, the pipe comprising an inner pipe wall;
    a hydrophobic layer interior to the inner pipe wall, wherein the hydrophobic layer comprises a kinetic hydrate inhibitor; and
    a fluid-solids stream interior to the hydrophobic layer and interior to the inner pipe wall, the fluid-solids stream comprising water, one or more hydrocarbons, and one or more other production stream components.

2. The pipe system of claim 1, wherein the pipe is installed in a subsea environment.

3. The pipe system of claim 1, wherein the one or more hydrocarbons comprise crude oil.

4. The pipe system of claim 1, wherein the pipe is installed in an environment having an ambient temperature less than about 70° F.

5. The pipe system of claim 1, wherein the pipe is installed in an environment having an ambient temperature less than about 60° F.

6. The pipe system of claim 1, wherein the hydrophobic layer comprises a self-assembled monolayer comprising molecules exposing hydrophobic tails.

7. The pipe system of claim 1, wherein the hydrophobic layer comprises a self-assembled monolayer comprising molecules, the molecules comprising a functional group on a tail end selected from the group consisting of hydrocarbons, alkanes, alkenes, alkynes, cycloalkanes, cycloalkenes, cycloalkynes, aromatic hydrocarbons, aryls, $C_8$ through $C_{18}$-thiols, amines, and phosphates.

8. A method of transporting a fluid comprising:
    providing a pipe, the pipe comprising an inner pipe wall;

installing a hydrophobic layer interior to the inner pipe wall, wherein the hydrophobic layer comprises a kinetic hydrate inhibitor; and flowing a fluid-solids stream through the pipe, the fluid interior to the hydrophobic layer and interior to the inner pipe wall, the fluid-solids stream comprising water, one or more hydrocarbons, and one or more other production stream components.

9. The method of claim 8, wherein the transporting stream is one or more subsea well stream(s).

10. The method of claim 8, further comprising installing the pipe in a subsea environment having an ambient temperature lesson about 55° F.

11. The method of claim 8, further comprising connecting one end of the pipe to a structure floating on a body of water.

12. The method of claim 11, wherein the floating structure is selected from the group consisting of a semi submersible, a spar, an FPSO, and a TLP.

13. The method of claim 8, wherein the liquid comprises crude oil.

14. A pipe system comprising:
a pipe comprising an inner pipe wall;
a hydrophobic layer interior to the inner pipe wall, wherein the hydrophobic layer comprises a self-assembled monolayer; and
a fluid-solids stream interior to the hydrophobic layer and interior to the inner pipe wall, the fluid-solids stream comprising water, one or more hydrocarbons, and one or more other production stream components.

15. The pipe system of claim 14, wherein the self-assembled monolayer comprises 14-phenyl-1-tetradecanethiol.

* * * * *